US012571319B2

(12) United States Patent
Jang et al.

(10) Patent No.: US 12,571,319 B2
(45) Date of Patent: Mar. 10, 2026

(54) TURBINE COMPONENT HAVING AIR-JET COOLING STRUCTURE, AND GAS TURBINE INCLUDING SAME

(71) Applicants: DOOSAN ENERBILITY CO., LTD., Changwon (KR); UIF (UNIVERSITY INDUSTRY FOUNDATION), YONSEI UNIVERSITY, Seoul (KR)

(72) Inventors: Yun Chang Jang, Changwon (KR); Ki Don Lee, Gimhae (KR); Hyung Hee Cho, Seoul (KR); Gyeong Ryun Kim, Seoul (KR); Jae Hyeong Kim, Geoje (KR)

(73) Assignees: DOOSAN ENERBILITY CO., LTD, Changwon (KR); UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 0 days.

(21) Appl. No.: 18/918,095

(22) Filed: Oct. 17, 2024

(65) Prior Publication Data

US 2025/0237146 A1 Jul. 24, 2025

(30) Foreign Application Priority Data

Jan. 22, 2024 (KR) ........................ 10-2024-0009269

(51) Int. Cl.
*F01D 5/18* (2006.01)

(52) U.S. Cl.
CPC .......... *F01D 5/189* (2013.01); *F05D 2240/35* (2013.01); *F05D 2250/11* (2013.01); (Continued)

(58) Field of Classification Search
CPC .......... F01D 5/187; F01D 5/188; F01D 5/189; F05D 2240/35; F05D 2250/11; F05D 2260/201; F05D 2260/22141
See application file for complete search history.

(56) References Cited

U.S. PATENT DOCUMENTS

| | | | | |
|---|---|---|---|---|
| 5,467,815 A * | 11/1995 | Haumann | ............... | F28F 13/02<br>165/908 |
| 5,533,864 A * | 7/1996 | Nomoto | .................. | F23R 3/002<br>415/115 |

(Continued)

FOREIGN PATENT DOCUMENTS

| | | |
|---|---|---|
| CN | 211924254 U | 11/2020 |
| CN | 112855285 B | 3/2023 |

(Continued)

OTHER PUBLICATIONS

European Search Report, dated Apr. 2, 2025.
Office Action From Japanese Patent Office Dated Nov. 18, 2025 Issued for Japanese Patent Application 2024-199885.

*Primary Examiner* — Courtney D Heinle
*Assistant Examiner* — Ryan C Clark
(74) *Attorney, Agent, or Firm* — Harvest IP Law, LLP

(57) ABSTRACT

An airfoil of a turbine blade or a turbine vane includes a coolant flow cavity formed in an interior of the airfoil, an insert section inserted into the coolant flow cavity and having a plurality of cooling holes, and a cooling structure arranged between an outer surface of the insert section and an inner surface of the coolant flow cavity, wherein the cooling structure includes a support part disposed in close contact with the outer surface of the insert section and having a plurality of impinging air-jet holes in fluid communication with the plurality of cooling holes, and a cooling fin connected between a distal side of the support part relative to a center of the airfoil and the inner surface of the coolant flow cavity.

18 Claims, 9 Drawing Sheets

(52) U.S. Cl.
CPC .................. *F05D 2260/201* (2013.01); *F05D 2260/22141* (2013.01)

(56) References Cited

U.S. PATENT DOCUMENTS

| | | | | | |
|---|---|---|---|---|---|
| 6,000,908 | A * | 12/1999 | Bunker | F01D 5/189 | 415/176 |
| 7,938,624 | B2 | 5/2011 | Tibbott | | |
| 8,387,396 | B2 * | 3/2013 | Chen | F01D 25/12 | 60/755 |
| 8,529,193 | B2 * | 9/2013 | Venkataramanan | F01D 5/186 | 415/115 |
| 8,608,430 | B1 | 12/2013 | Liang | | |
| 8,667,682 | B2 * | 3/2014 | Lee | F01D 9/023 | 60/39.01 |
| 8,777,569 | B1 * | 7/2014 | Liang | F01D 5/189 | 416/96 A |
| 9,347,324 | B2 * | 5/2016 | Lee | F01D 5/188 | |
| 9,976,441 | B2 * | 5/2018 | Lacy | F01D 25/12 | |
| 10,370,981 | B2 * | 8/2019 | Slavens | F01D 5/187 | |
| 10,753,208 | B2 * | 8/2020 | Widener | F01D 5/186 | |
| 10,815,828 | B2 * | 10/2020 | Widener | B33Y 80/00 | |
| 2008/0063524 | A1 * | 3/2008 | Tibbott | F01D 5/187 | 415/115 |
| 2013/0081401 | A1 * | 4/2013 | Kim | F23R 3/50 | 60/752 |
| 2017/0356299 | A1 * | 12/2017 | Dutta | F01D 5/189 | |
| 2021/0246796 | A1 * | 8/2021 | Galoul | F01D 5/188 | |
| 2021/0246797 | A1 * | 8/2021 | Galoul | F01D 5/188 | |

FOREIGN PATENT DOCUMENTS

| | | | | |
|---|---|---|---|---|
| EP | 2716868 | B1 | 9/2020 | |
| EP | 3988763 | A1 * | 4/2022 | F01D 5/187 |
| GB | 2492374 | A * | 1/2013 | F23R 3/002 |
| JP | 523990 | B2 | 8/2010 | |
| JP | 4586265 | B2 | 11/2010 | |
| JP | 2011163344 | A * | 8/2011 | F01D 5/187 |
| JP | 2016-223447 | A | 12/2016 | |
| KR | 2018-0065728 | A | 6/2018 | |
| KR | 10-1877644 | B1 | 7/2018 | |
| KR | 2022-0074692 | A | 6/2022 | |
| KR | 10-2502652 | B1 | 2/2023 | |
| WO | 2011-020485 | A1 | 2/2011 | |

* cited by examiner

TURBINE COMPONENT HAVING AIR-JET COOLING STRUCTURE, AND GAS TURBINE INCLUDING SAME

CROSS REFERENCE TO RELATED APPLICATION

The present application claims priority to Korean Patent Application No. 10-2024-0009269, filed on Jan. 22, 2024, the entire contents of which are incorporated herein for all purposes by this reference.

BACKGROUND

1. Technical Field

The present disclosure relates to a turbine component having an air-jet cooling structure, and a gas turbine including the same.

2. Description of the Related Art

Generally, turbines, such as steam turbines, gas turbines, and the like, are machines that obtain rotating force with impulsive force using a flow of a compressed fluid such as gas.

The gas turbine generally includes a compressor, a combustor, and a turbine. The compressor has a compressor housing in which compressor vanes and compressor blades are alternately arranged, along with an air inlet.

The combustor serves to supply fuel to compressed air from the compressor and ignite the air-fuel gas with a burner to produce high temperature and high pressure combustion gas.

The turbine has a turbine housing in which turbine vanes and turbine blades are alternately arranged. A rotor is centrally disposed through the compressor, the combustor, the turbine, and an exhaust chamber.

The rotor is rotatably supported by bearings at opposite ends thereof. A plurality of disks is fixed to the rotor so that respective blades are attached thereto, and a driving shaft of a driving unit, such as a generator or the like, is coupled to an end side of the rotor on the exhaust chamber side.

Since such a gas turbine is devoid of a reciprocating mechanism such as a piston of a 4-stroke engine, there are no friction-causing features such as piston-cylinder contact parts, and thus the turbine has advantages of a significant reduction in lubricant consumption and amplitude of vibration, which are characteristics of a reciprocating mechanism, whereby high speed movement is enabled.

Briefly explaining the operation of the gas turbine, air compressed by the compressor is mixed with fuel and combusted in the combustor to provide hot combustion gas, which is then injected towards the turbine. As the injected combustion gas passes through the turbine vanes and the turbine blades, a rotating force is created and the rotor rotates.

Regarding the cooling of an airfoil of the turbine blade or turbine vane, conventional technology includes an impinging air-jet cooling flow path structure where only a plurality of cooling holes are formed in the air-jetting plate, and no cooling structures, such as cooling fins, are provided. Thus, improving the cooling design for the airfoil is highly necessary. The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a turbine component having an impinging air-jet cooling structure in which a plurality of support parts and cooling fins are formed in an impinging air-jet cooling flow path of an airfoil to reduce the cross-flow of impinging air-jet and improve cooling efficiency, and a gas turbine including the same.

An aspect of the present disclosure provides an airfoil of a turbine blade or a turbine vane including: a coolant flow cavity formed in the interior of the airfoil; an insert section inserted into the coolant flow cavity and having a plurality of cooling holes; and a cooling structure arranged between an outer surface of the insert section and an inner surface of the coolant flow cavity, the cooling structure including: a support part disposed in close contact with the outer surface of the insert section and having a plurality of impinging air-jet holes in fluid communication with the plurality of cooling holes; and a cooling fin connected between a distal side of the support part relative to a center of the airfoil and the inner surface of the coolant flow cavity.

The support part may be formed as a circular disk with a predetermined thickness.

The plurality of impinging air-jet holes may include a first air-jet hole disposed upstream of the cooling fin, and a pair of second air-jet holes disposed downstream of the cooling fin.

Assuming that a diameter of each of the impinging air-jet holes is d, a longitudinal length z of the cooling fin may be formed to be 2 to 4 times d, and a thickness t of the support part may be formed to be 2 to 4 times d.

The support part may be formed as a triangular disk of a predetermined thickness having rounded vertices.

For the support part formed as a triangular disk of a predetermined thickness having rounded vertices, the plurality of impinging air-jet holes may include a first air-jet hole disposed upstream of the cooling fin, and a pair of second air-jet holes disposed downstream of the cooling fin.

For the support part formed as a triangular disk of a predetermined thickness having rounded vertices, assuming that a diameter of each of the plurality of impinging air-jet holes is d, a longitudinal length z of the cooling fin may be formed to be 2 to 4 times d, and a thickness t of the support part may be formed to be 2 to 4 times d.

The support part may be formed as a triangular disk with rounded corners and two convex sides, having a predetermined thickness, with each of the rounded corners located around each of the plurality of impinging air-jet holes and each of the two convex sides positioned between a pair of the rounded corners.

For the support part formed as a triangular disk with rounded corners and two convex sides, the plurality of impinging air-jet holes may include a first air-jet hole disposed upstream of the cooling fin, and a pair of second air-jet holes disposed downstream of the cooling fin.

For the support part formed as a triangular disk with rounded corners and two convex sides, assuming that a diameter of each of the plurality of impinging air-jet holes is d, a longitudinal length z of the cooling fin may be formed to be 2 to 4 times d, and a thickness t of the support part may be formed to be 2 to 4 times d.

Another aspect of the present disclosure provides a gas turbine including: a compressor configured to compress incoming air; a combustor configured to mix the compressed air with fuel and combust an air-fuel mixture; and a turbine having turbine blades and turbine vanes installed in a turbine housing so that the turbine blades are rotated by combustion gases discharged from the combustor, wherein an airfoil of each of the turbine blades or the turbine vanes includes: a coolant flow cavity formed in an interior of the airfoil; an insert section inserted into the coolant flow cavity and having a plurality of cooling holes; and a cooling structure arranged between an outer surface of the insert section and an inner surface of the coolant flow cavity, the cooling structure including: a support part disposed in close contact with the outer surface of the insert section and having a plurality of impinging air-jet holes in fluid communication with the plurality of cooling holes; and a cooling fin connected between a distal side of the support part relative to a center of the airfoil and the inner surface of the coolant flow cavity.

The support part may be formed as a circular disk of a predetermined thickness.

The plurality of impinging air-jet holes may include a first air-jet hole disposed upstream of the cooling fin, and a pair of second air-jet holes disposed downstream of the cooling fin.

Assuming that a diameter of each of the plurality of impinging air-jet holes is d, a longitudinal length z of the cooling fin may be formed to be 2 to 4 times d, and a thickness t of the support part may be formed to be 2 to 4 times d.

The support part may be formed as a triangular disk of a predetermined thickness having rounded vortices.

For the support part formed as a triangular disk of a predetermined thickness having rounded vertices, the plurality of impinging air-jet holes may include a first air-jet hole disposed upstream of the cooling fin, and a pair of second air-jet holes disposed downstream of the cooling fin.

For the support part formed as a triangular disk of a predetermined thickness having rounded vertices, assuming that a diameter of each of the plurality of impinging air-jet holes is d, a longitudinal length z of the cooling fin may be formed to be 2 to 4 times d, and a thickness t of the support part may be formed to be 2 to 4 times d.

The support part may be formed as a triangular disk with rounded corners and two convex sides, having a predetermined thickness, with each of the rounded corners located around each of the plurality of impinging air-jet holes and each of the two convex sides positioned between a pair of the rounded corners.

For the support part formed as a triangular disk with rounded corners and two convex sides, the plurality of impinging air-jet holes may include a first air-jet hole disposed upstream of the cooling fin, and a pair of second air-jet holes disposed downstream of the cooling fin.

For the support part formed as a triangular disk with rounded corners and two convex sides, assuming that a diameter of each of the plurality of impinging air-jet holes is d, a longitudinal length z of the cooling fin may be formed to be 2 to 4 times d, and a thickness t of the support part may be formed to be 2 to 4 times d.

According to the turbine component having the fin-type air-jet cooling structure and the gas turbine including the same, the plurality of support parts and cooling fins are formed in the air-jet impinging cooling flow path of the airfoil to reduce the cross-flow of impinging air-jet and improve cooling efficiency.

DETAILED DESCRIPTION

Figure 1:
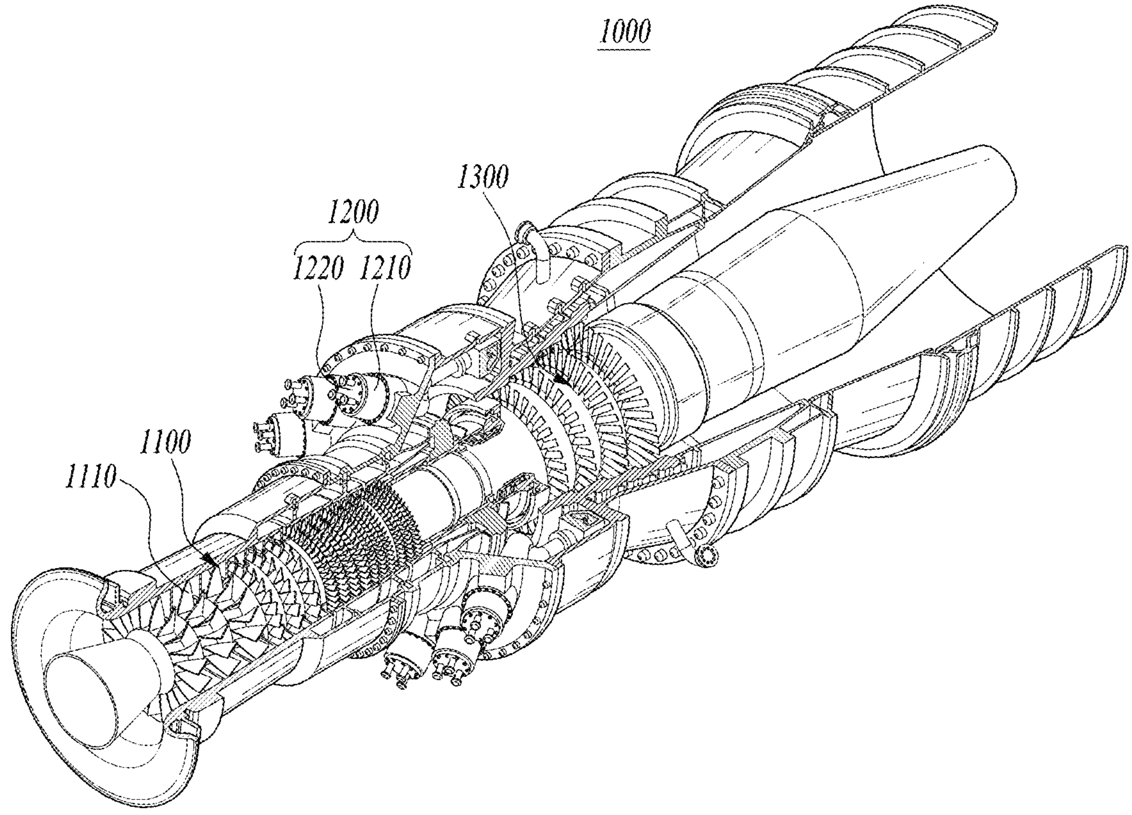
FIG. 1 is a partially cut-away perspective view illustrating a gas turbine according to an embodiment of the present disclosure.

Hereinafter, exemplary embodiments of the present disclosure will be described in detail with reference to the accompanying drawings. However, it should be noted that the present disclosure is not limited thereto, but may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the terms “including” or “including” specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 2:
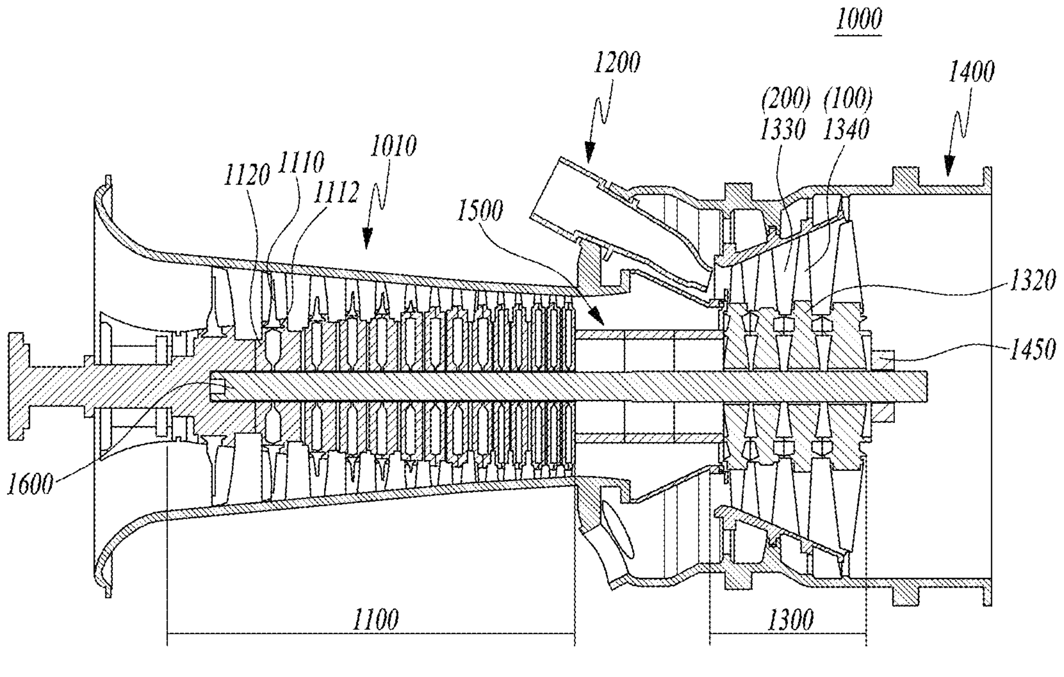
FIG. 2 is a cross-sectional view illustrating a schematic structure of a gas turbine according to an embodiment of the present disclosure.

FIG. 1 is a partially cut-away perspective view illustrating a gas turbine according to an embodiment of the present disclosure, and FIG. 2 is a cross-sectional view illustrating a schematic structure of a gas turbine according to an embodiment of the present disclosure.

As illustrated in FIG. 1, a gas turbine 1000 according to an embodiment of the present disclosure includes a compressor 1100, a combustor 1200, and a turbine 1300. The compressor 1100 includes a plurality of blades 1110 radially installed. The compressor 1100 rotates the blade 1110 so that air flows while being compressed by the rotation of the blade 1110. The size and installation angle of the blade 1110 may vary depending on the installation location. In one embodiment, the compressor 1100 is connected directly or indirectly to the turbine 1300, and receives a portion of the power generated from the turbine 1300 to rotate the blade 1110.

Air compressed by the compressor 1100 flows to the combustor 1200. The combustor 1200 includes a plurality of combustion chambers 1210 and a fuel nozzle module 1220 arranged in an annular shape.

The gas turbine 1000 includes a housing 1010 and a diffuser 1400 which is disposed on a rear side of the housing 1010 and through which a combustion gas passing through a turbine is discharged. A combustor 1200 is disposed in front of the diffuser 1400 so as to receive and burn compressed air.

Referring to the flow direction of the air, a compressor 1100 is located on the upstream side of the housing 1010, and a turbine 1300 is located on the downstream side of the housing. A torque tube unit 1500 is disposed as a torque transmission member between the compressor 1100 and the turbine 1300 to transmit the rotational torque generated in the turbine 1300 to the compressor 1100.

The compressor 1100 is provided with a plurality (for example, 14) of compressor rotor disks 1120, which are fastened by a tie rod 1600 to prevent axial separation thereof.

Specifically, the compressor rotor disks 1120 are axially arranged, wherein the tie rod 1600 constituting a rotary shaft passes through substantially central portion thereof. Here, the neighboring compressor rotor disks 1120 are disposed so that opposed surfaces thereof are pressed by the tie rod 1600 and the neighboring compressor rotor disks do not rotate relative to each other.

A plurality of blades 1110 is radially coupled to an outer circumferential surface of the compressor rotor disk 1120. Each of the blades 1110 has a dovetail part 1112 which is fastened to the compressor rotor disk 1120.

Vanes (not shown) fixed to the housing are respectively positioned between the rotor disks 1120. Unlike the rotor disks, the vanes are fixed to the housing and do not rotate. The vane serves to align a flow of compressed air that has passed through the blades of the compressor rotor disk and guide the air to the blades of the rotor disk located on the downstream side.

The fastening method of the dovetail part 1112 includes a tangential type and an axial type. These may be chosen according to the required structure of the commercial gas turbine, and may have a generally known dovetail or fir-tree shape. In some cases, it is possible to fasten the blades to the rotor disk by using other fasteners such as keys or bolts in addition to the fastening shape.

The tie rod 1600 is arranged to pass through the center of the compressor rotor disks 1120 and turbine rotor disks 1320 such that one end thereof is fastened in the compressor rotor disk located on the most upstream side and the other end thereof is fastened by a fixing nut 1450, wherein the tie rod 1600 may be composed of a single tie rod or a plurality of tie rods.

The shape of the tie rod 1600 is not limited to that shown in FIG. 2, but may have a variety of structures depending on the gas turbine. That is, as illustrated in the drawing, one tie rod may have a shape passing through a central portion of the rotor disk, a plurality of tie rods may be arranged in a circumferential manner, or a combination thereof may be used.

Although not shown, the compressor of the gas turbine may be provided with a vane serving as a guide element at the next position of the diffuser in order to adjust a flow angle of a pressurized fluid entering a combustor inlet to a designed flow angle. The vane is referred to as a deswirler.

The combustor 1200 mixes the introduced compressed air with fuel and combusts the air-fuel mixture to produce a high-temperature and high-temperature and high-pressure combustion gas. With an isobaric combustion process in the compressor, the temperature of the combustion gas is increased to the heat resistance limit that the combustor and the turbine components can withstand.

The combustor consists of a plurality of combustors, which is arranged in the housing formed in a cell shape, and includes a burner having a fuel injection nozzle and the like, a combustor liner forming a combustion chamber, and a transition piece as a connection between the combustor and the turbine, thereby constituting a combustion system of a gas turbine.

Specifically, the combustor liner provides a combustion space in which the fuel injected by the fuel nozzle is mixed with the compressed air of the compressor and the fuel-air mixture is combusted. Such a liner may include a flame canister providing a combustion space in which the fuel-air mixture is combusted, and a flow sleeve forming an annular space surrounding the flame canister. A fuel nozzle is coupled to the front end of the liner, and an igniter plug is coupled to the side wall of the liner.

On the other hand, a transition piece is connected to a rear end of the liner so as to transmit the combustion gas combusted by the igniter plug to the turbine side. An outer wall of the transition piece is cooled by the compressed air supplied from the compressor so as to prevent thermal breakage due to the high temperature combustion gas.

To this end, the transition piece is provided with cooling holes through which compressed air is injected into and cools the inside of the transition piece and flows towards the liner.

The air that has cooled the transition piece flows into the annular space of the liner and compressed air is supplied as a cooling air to the outer wall of the liner from the outside of the flow sleeve through cooling holes provided in the flow sleeve so that both air flows may collide with each other.

In the meantime, the high-temperature and high-pressure combustion gas from the combustor is supplied to the turbine 1300. The supplied high-temperature and high-pressure combustion gas expands and collides with and provides a reaction force to rotating blades of the turbine to cause a rotational torque, which is then transmitted to the compressor through the torque tube. Here, an excess of power required to drive the compressor is used to drive a generator or the like.

The turbine 1300 is basically similar in structure to the compressor. That is, the turbine 1300 is also provided with a plurality of turbine rotor disks 1320 similar to the compressor rotor disks of the compressor 1100. Thus, the turbine rotor disk 1320 also includes a plurality of turbine blades 1340 disposed radially. The turbine blade 1340 may also be coupled to the turbine rotor disk 1320 in a dovetail coupling manner, for example. Between the blades 1340 of the turbine rotor disk 1320, a turbine vane 1330 fixed to the housing is provided to guide a flow direction of the combustion gas passing through the blades.

Figure 3:
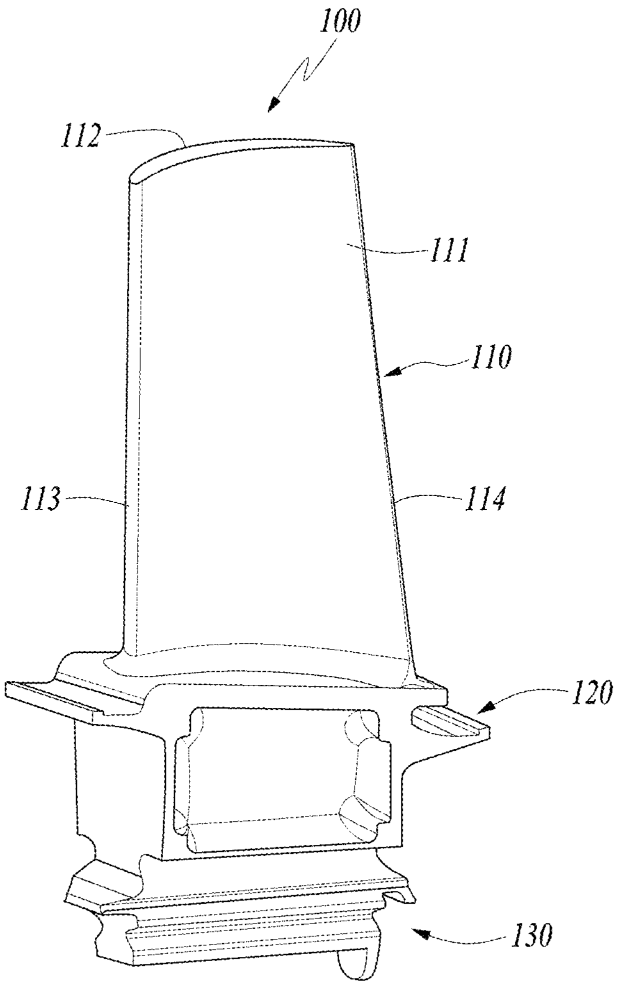
FIG. 3 is a perspective view illustrating a turbine blade according to an embodiment of the present disclosure.

FIG. 3 is a perspective view illustrating a turbine blade according to an embodiment of the present disclosure. In FIG. 3, unlike FIG. 2, the turbine blade is labeled with the reference numeral "100".

The turbine blade 100 includes an airfoil 110 on an upper side or radially outer side so as to rotate with the pressure of combustion gases, a platform part 120 integrally formed at the bottom or radially inner side of the airfoil, and a root part 130 integrally formed at the bottom of the platform part and coupled to a turbine rotor disk 1320. The platform part may be internally provided with an inlet through which cooling fluid is supplied to an internal flow path formed inside of the airfoil 110.

The airfoil 110 includes a suction surface 112 convexly formed outwardly on one side where combustion gases are introduced, and a pressure surface 111 concavely formed on the opposite side of the suction surface. The front side edge where the pressure surface 111 and the suction surface 112 meet forms a leading edge 113, and the rear side edge forms a trailing edge 114. An internal flow path or a coolant flow cavity (not shown) may be formed inside of the airfoil 110 so that cooling air introduced through the inlet may flow therethrough.

The platform part 120 abuts against a platform part 120 of a neighboring turbine blade at a lateral side to maintain spacing between the neighboring blades.

The root part 130 may have an axial-type configuration that is inserted along the axial direction of the turbine rotor disk into an engagement slot formed in the outer circumferential surface of the turbine rotor disk 1320. The root part 130 may have a roughly dovetailed or fir-tree-shaped bend, which may be formed to correspond to the shape of a bend formed in the engagement slot.

Figure 4:
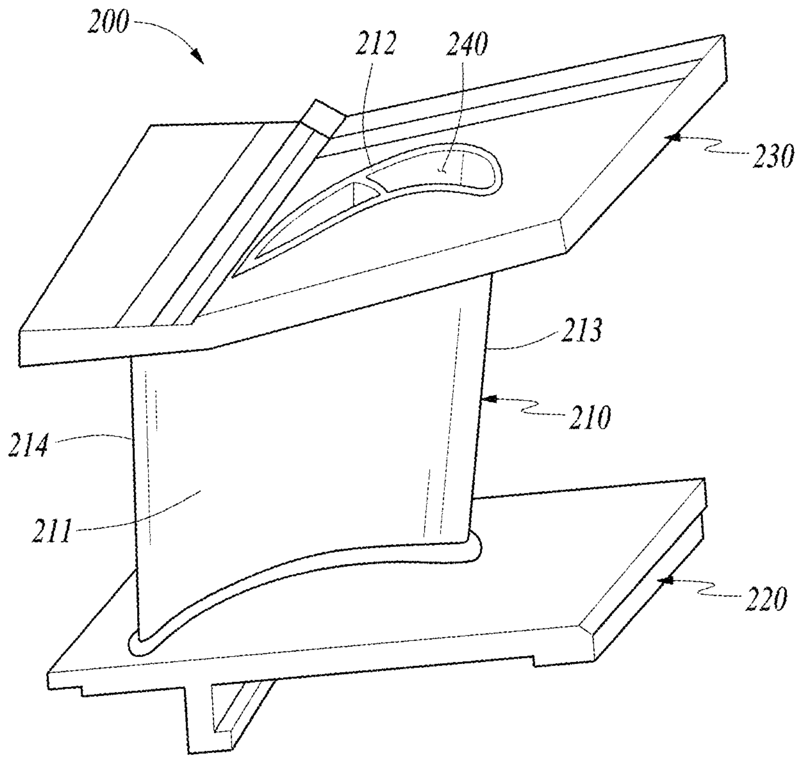
FIG. 4 is a perspective view illustrating a turbine vane according to an embodiment of the present disclosure.

FIG. 4 is a perspective view illustrating a turbine vane according to an embodiment of the present disclosure. In FIG. 4, unlike FIG. 2, the turbine vane is labeled with the reference numeral "200".

The turbine vane 200 may include an airfoil 210 secured between the turbine blades 100 to guide a flow of combustion gases through the turbine blades, an inner end wall 220 formed on a radially inward side of the airfoil, and an outer end wall 230 formed on a radially outward side of the airfoil.

Like the airfoil 110 of the turbine blade 100, an airfoil 210 of the turbine vane 200 includes a concave pressure surface 211 and an opposing convex suction surface 212, as well as a leading edge 213 and a trailing edge 214.

Inside the airfoil 210, a coolant flow cavity 240 may be formed in a manner that is separated by one or more partition walls. The coolant flow cavity 240 may be formed to be radially elongated within the interior of the airfoil 210.

Figure 5:
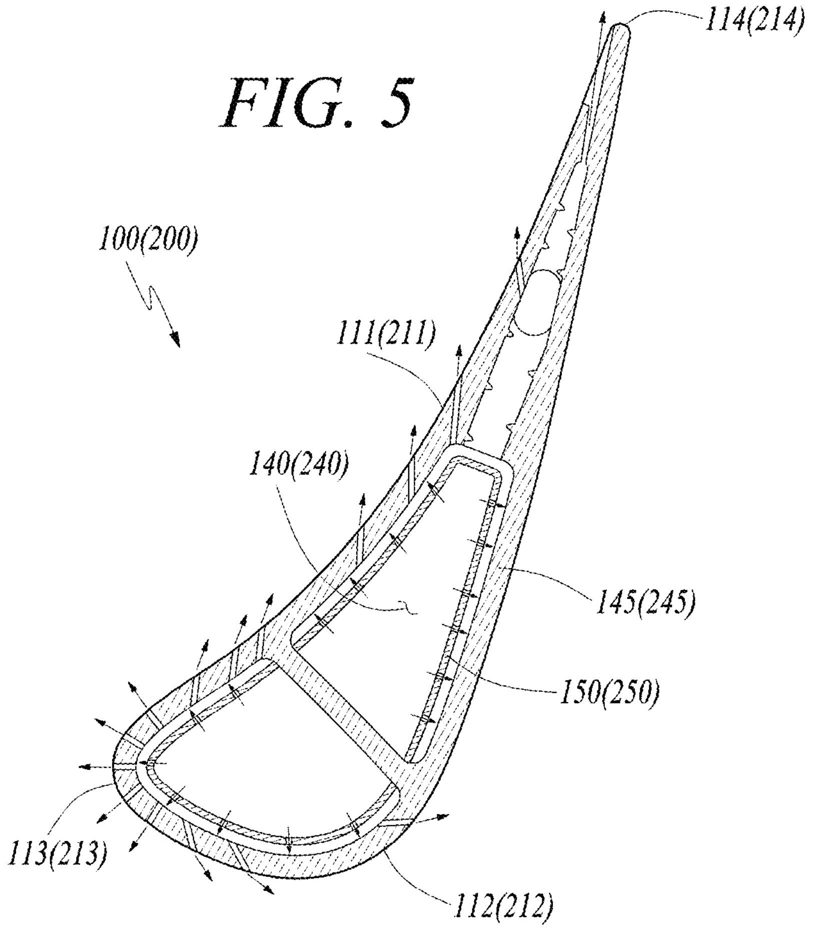
FIG. 5 is a cross-sectional view illustrating an airfoil according to an embodiment of the present disclosure.
Figure 6:
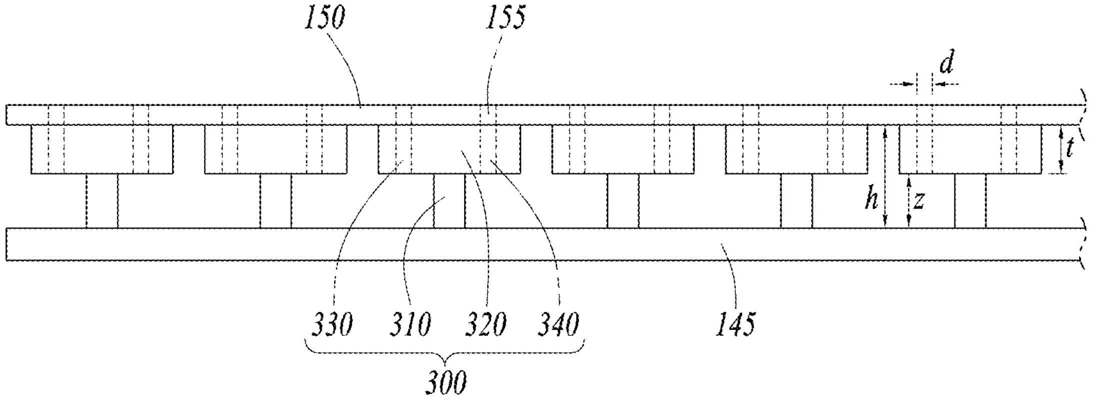
FIG. 6 is a cross-sectional view illustrating a cooling structure arranged between an insert section and an outer wall of a coolant flow cavity.

FIG. 5 is a cross-sectional view illustrating an airfoil according to an embodiment of the present disclosure, and FIG. 6 is a cross-sectional view illustrating a cooling structure arranged between an insert section and an outer wall of a coolant flow cavity.

In the present disclosure, an airfoil 110 and 210 of a turbine blade 100 or turbine vane 200 includes a coolant flow cavity 140 and 240 formed in the interior of the airfoil, an insert section 150 and 250 inserted into the interior of the coolant flow cavity and having a plurality of cooling holes 155, and a plurality of cooling structures 300 formed between an outer surface of the insert section and an inner surface of the coolant flow cavity.

The coolant flow cavity 140 and 240 may be partitioned by one or more partition walls into two or more sub cavities in the interior of the airfoil 110 and 210.

The insert section 150 and 250 may be formed to have a shape corresponding to that of an inner circumferential surface of the coolant flow cavity 140 and 240, and may be inserted and fitted into the interior of the coolant flow cavity 140 and 240. The circumferential walls of the insert section 150 and 250 may be perforated with a plurality of cooling holes 155, such that cooling air inside of the insert section may flow out of the inserts through the plurality of cooling holes 155. Alternatively, the airfoil 110 and 210 may be fabricated such that a structure corresponding to the insert section 150 and 250 is integrally formed inside of the coolant flow cavity 140 and 240.

The plurality of cooling structures 300 may be integrally formed to be arranged between the outer surface of the insert section 150 and 250 and the inner surface of the coolant flow cavity 140 and 240. The plurality of cooling structures 300 integrally formed to be connected between the outer surface of the insert section 150 and 250 and the inner surface of the coolant cavity 140 and 240 may be arranged to guide cooling air flowing through the plurality of cooling holes 155 and increase impingement cooling effectiveness.

As illustrated in FIG. 6, the cooling structure 300 may include a support part 320 abutted against the outer surface of the insert section 150 and having a plurality of impinging air-jet holes 330 and 340 in fluid communication with the plurality of cooling holes 155, and a cooling fin 310 connected between a distal side of the support part relative to a center of the airfoil and the inner surface of the coolant flow cavity 140.

The support part 320 may be formed to abut against the outer surface of the insert section 150 and may have a shape surrounding the impinging air-jet holes 330 and 340 formed at locations corresponding to the plurality of cooling holes 155. The support part 320 may be formed to have a thickness t of approximately half of the longitudinal length of the spacing h between the outer surface of the insert section 150 and the inner surface of the coolant flow cavity 140.

The plurality of impinging air-jet holes 330 and 340 may be formed to penetrate through the support part 320 in the thickness direction at locations before and after the cooling fin 310 in a flow direction of the cooling air.

One end of the cooling fin 310 may be connected to the distal side of the support part 320 relative to a center of the airfoil at the approximately central portion of the distal side. Further, the other end of the cooling fin 310 may be integrally connected to an inner circumferential surface of an outer wall 145 of the coolant flow cavity 140.

The circumferential walls of the insert section 150 having the plurality of cooling holes 155 may constitute an air-jetting plate in the impinging air-jet cooling flow path, and the inner circumferential surface of the outer wall 145 of the coolant flow cavity 140 may constitute a target surface against which the cooling air impinges.

Figure 7A:
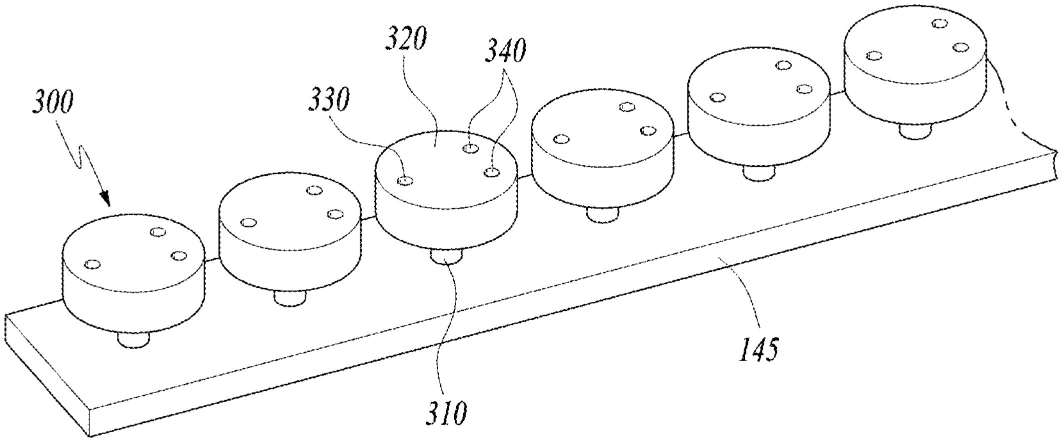
FIG. 7A is a perspective view illustrating a cooling structure according to a first embodiment of the present disclosure.
Figure 7B:
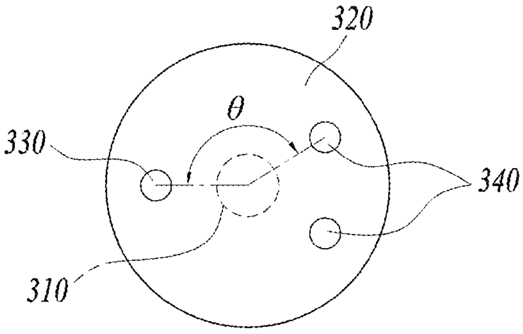
FIG. 7B is a top view illustrating the cooling structure according to the first embodiment.

FIG. 7A is a perspective view illustrating a cooling structure according to a first embodiment of the present disclosure, and FIG. 7B is a top view illustrating the cooling structure according to the first embodiment.

In the cooling structure 300 according to the first embodiment of the present disclosure, the support part 320 may be formed as a circular disk of a predetermined thickness. In the support part 320, a plurality of impinging air-jet holes 330 and 340 may be formed in a longitudinal direction of the cooling fin 310 at locations before and after the cooling fin 310.

The plurality of impinging air-jet holes 330 and 340 may include a first air-jet hole 330 disposed upstream of the cooling fin 310 and a pair of second air-jet holes 340 disposed downstream of the cooling fin 310.

The first air-jet hole 330 and the pair of second air-jet holes 340 may be formed in the form of a circular hole with a diameter smaller than that of the cooling fin 310. The first air-jet hole 330 may be disposed a first predetermined distance upstream of the center of the cooling fin 310 in the flow direction of the cooling air. The pair of second air-jet holes 340 may be disposed a second predetermined distance downstream of the center of the cooling fin 310. The pair of second air-jet holes 340 may be formed to be laterally spaced a third predetermined distance in opposite direction from an extension of line connecting the center of the first air-jet hole 330 and the center of the cooling fin 310. In other words, the center of the first air-jet hole 330 and the centers of the pair of second air-jet holes 340 may form vertices of an isosceles triangle.

As illustrated in FIG. 7B, an angle θ defined by the center of the first air-jet hole 330 and the center of each of the pair of second air-jet holes 340 with respect to the center of the cooling fin 310 may have a range of 140 to 160 degrees, particularly approximately 150 degrees. In this case, the pair of second air-jet holes 340 may be spaced far enough apart so that the distance between their centers is greater than the diameter of the cooling fin 310.

Assuming that the diameter of each of the impinging air-jet holes is d, a longitudinal length z of the cooling fin may be formed to be 2 to 4 times d, and the thickness t of the support part may be formed to be 2 to 4 times d, as illustrated in FIG. 6.

The diameter d of the first air-jet hole 330 and the second air-jet hole 340 may be formed to be the same as the cooling holes 155 of the insert section 150 forming an air-jetting plate. The diameter d of the first air-jet hole 330 and the pair of second air-jet holes 340 may be formed to have a range from 0.8 mm to 1.2 mm.

The longitudinal length z of the cooling fin 310 may be formed to be 2 to 4 times the diameter d of the impinging air-jet holes 330 and 340. The thickness t of the support part 320 may be formed to be 2 to 4 times the diameter d of the impingement air-jet holes 330 and 340.

Accordingly, a distance h between the outer surface of the insert section 150 and the inner circumferential surface of the outer wall 145 of the coolant flow cavity 140 that forms an air-jet target surface may be formed to be 4 to 8 times the diameter d of the air-jet holes 330 and 340. In other words, the longitudinal length z of the cooling fin 310 and the thickness t of the support part 320 may be formed to be approximately half of the distance h between the outer surface of the insert section 150 and the inner circumferential surface of the outer wall 145 of the coolant flow cavity 140.

Figure 8:
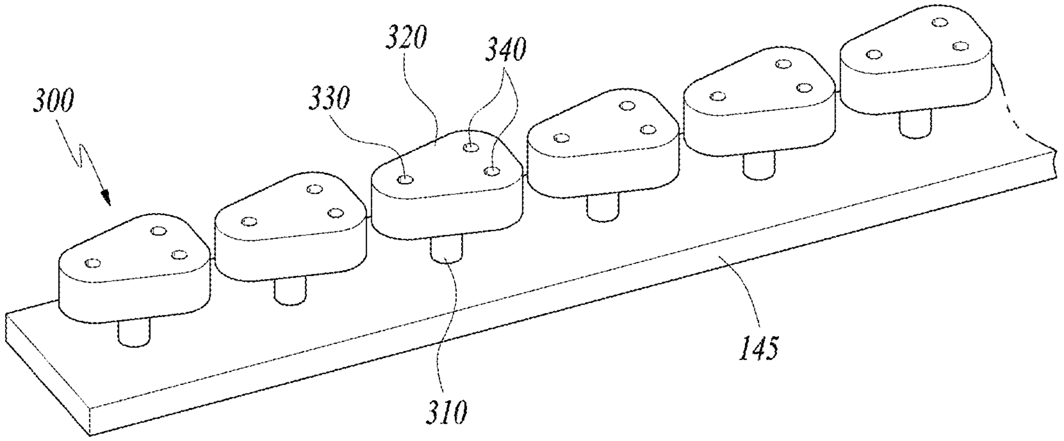
FIG. 8 is a perspective view illustrating a cooling structure according to a second embodiment of the present disclosure.

FIG. 8 is a perspective view illustrating a cooling structure according to a second embodiment of the present disclosure.

In the cooling structure 300 according to the second embodiment of the present disclosure, a support part 320 may be formed as a triangular disk of a predetermined thickness having rounded vertices. In the support part 320, a plurality of impinging air-jet holes 330 and 340 may be formed in a longitudinal direction of the cooling fin 310 at locations before and after the cooling fin 310.

The plurality of impinging air-jet holes 330 and 340 may include a first air-jet hole 330 disposed upstream of the cooling fin 310 and a pair of second air-jet holes 340 disposed downstream of the cooling fin 310. The first air-jet hole 330 and the pair of second air-jet holes 340 may be disposed within three rounded vertices of the support part 320. In other words, the support part 320 may be formed as a vertices-rounded isosceles triangular disk having the three air-jet holes 330 and 340.

The first air-jet hole 330 and the pair of second air-jet holes 340 may be formed in the form of a circular hole with a diameter smaller than that of the cooling fin 310. The first air-jet hole 330 may be disposed a first predetermined distance upstream of the center of the cooling fin 310 in the flow direction of the cooling air. The pair of second air-jet holes 340 may be disposed a second predetermined distance downstream of the center of the cooling fin 310. The pair of second air-jet holes 340 may be formed to be laterally spaced a third predetermined distance in opposite direction from an extension of line connecting the center of the first air-jet hole 330 and the center of the cooling fin 310. In other words, the center of the first air-jet hole 330 and the center of the pair of second air-jet holes 340 may form vertices of an isosceles triangle.

As illustrated in FIG. 7B, an angle θ defined by the center of the first air-jet hole 330 and the center of the second air-jet hole 340 with respect to the center of the cooling fin 310 may have a range of 140 to 160 degrees, particularly approximately 150 degrees. In this case, the pair of second air-jet holes 340 may be spaced far enough apart so that the distance between their centers is greater than the diameter of the cooling fin 310.

Assuming that the diameter of each of the impinging air-jet holes is d, a longitudinal length z of the cooling fin may be formed to be 2 to 4 times d, and the thickness t of the support part may be formed to be 2 to 4 times d, as illustrated in FIG. 6.

The diameter d of the first air-jet hole 330 and the second air-jet hole 340 may be formed to be the same as the cooling holes 155 of the insert section 150 forming an air-jetting plate. The diameter d of the first air-jet hole 330 and the second air-jet holes 340 may be formed to have a range from 0.8 mm to 1.2 mm.

The longitudinal length z of the cooling fin 310 may be formed to be 2 to 4 times the diameter d of the impinging air-jet holes 330 and 340. The thickness t of the support part 320 may be formed to be 2 to 4 times the diameter d of the impingement air-jet holes 330 and 340.

Accordingly, a distance h between the outer surface of the insert section 150 and the inner circumferential surface of the outer wall 145 of the coolant flow cavity 140 that forms an air-jet target surface may be formed to be 4 to 8 times the diameter d of the air-jet holes 330 and 340. In other words, the longitudinal length z of the cooling fin 310 and the thickness t of the support part 320 may be formed to be approximately half of the distance h between the outer surface of the insert section 150 and the inner circumferential surface of the outer wall 145 of the coolant flow cavity 140.

Figure 9:
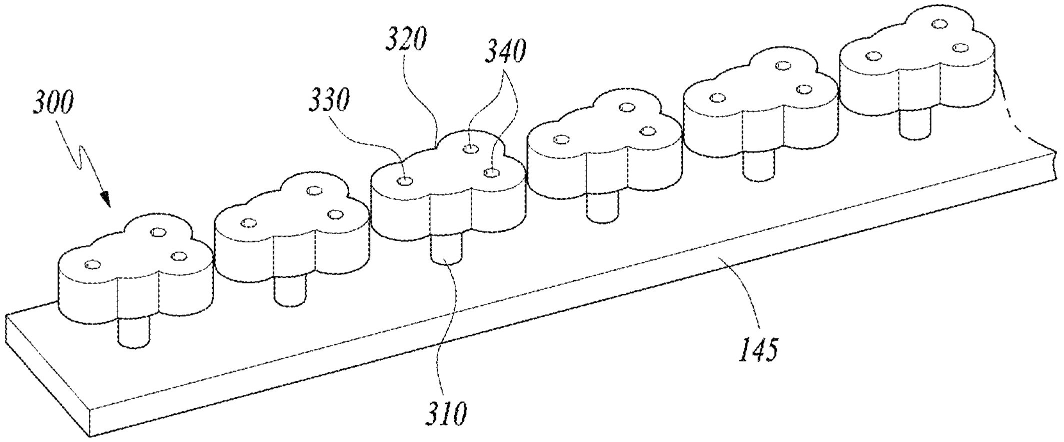
FIG. 9 is a perspective view illustrating a cooling structure according to a third embodiment of the present disclosure.

FIG. 9 is a perspective view illustrating a cooling structure according to a third embodiment of the present disclosure.

In the cooling structure 300 according to the second embodiment of the present disclosure, a support part 320 may be formed as a triangular disk with rounded corners and two convex sides, having a predetermined thickness, with each of the rounded corners located around each of the plurality of impinging air-jet holes 330 and 340 and each of the two convex sides positioned between a pair of the rounded corners. In the support part 320, a plurality of impinging air-jet holes 330 and 340 may be formed in a longitudinal direction of the cooling fin 310 at locations before and after the cooling fin 310.

The plurality of impinging air-jet holes 330 and 340 may include a first air-jet hole 330 disposed upstream of the cooling fin 310 and a pair of second air-jet holes 340 disposed downstream of the cooling fin 310. The first air-jet hole 330 and the pair of second air-jet holes 340 may be disposed within three rounded vertices or corners of the support part 320. In other words, a geometric figure formed by connecting the centers of the three impinging air-jet holes 330 and 340 may form an isosceles triangle.

The outline of the support part 320 may be formed by three arcuate surfaces with a constant radius of curvature surrounding the centers of the three impinging air-jet holes 330 and 340, and a pair of arcuate surfaces with a constant radius of curvature surrounding the center of the cooling fin 310, which are connected to each other.

The first air-jet hole 330 and the second air-jet holes 340 may be formed as a circular hole with a diameter smaller than that of the cooling fin 310. The first air-jet hole 330 may be disposed a first predetermined distance upstream of the center of the cooling fin 310 in the flow direction of the cooling air. The pair of second air-jet holes 340 may be disposed a second predetermined distance downstream of the center of the cooling fin 310. The pair of second air-jet holes 340 may be formed to be laterally spaced a third predetermined distance in opposite direction from an extension of line connecting the center of the first air-jet hole 330 and the center of the cooling fin 310. In other words, the center of the first air-jet hole 330 and the center of the pair of second air-jet holes 340 may form vertices of an isosceles triangle.

As illustrated in FIG. 7B, an angle θ defined by the center of the first air-jet hole 330 and the center of the second air-jet hole 340 with respect to the center of the cooling fin 310 may have a range of 140 to 160 degrees, particularly approximately 150 degrees. In this case, the pair of second air-jet holes 340 may be spaced so far apart such that the distance between their centers is greater than the diameter of the cooling fin 310.

Assuming that the diameter of each of the impinging air-jet holes is d, a longitudinal length z of the cooling fin may be formed to be 2 to 4 times d, and the thickness t of the support part may be formed to be 2 to 4 times d, as illustrated in FIG. 6.

The diameter d of the first air-jet hole 330 and the second air-jet hole 340 may be formed to be the same as the cooling holes 155 of the insert section 150 forming an air-jetting plate. The diameter d of the first air-jet hole 330 and the second air-jet holes 340 may be formed to have a range from 0.8 mm to 1.2 mm.

The longitudinal length z of the cooling fin 310 may be formed to be 2 to 4 times the diameter d of the impinging air-jet holes 330 and 340. The thickness t of the support part 320 may be formed to be 2 to 4 times the diameter d of the impingement air-jet holes 330 and 340.

Accordingly, a distance h between the outer surface of the insert section 150 and the inner circumferential surface of the outer wall 145 of the coolant flow cavity 140 that forms an air-jet target surface may be formed to be 4 to 8 times the diameter d of the air-jet holes 330 and 340. In other words, the longitudinal length z of the cooling fin 310 and the thickness t of the support part 320 may be formed to be approximately half of the distance h between the outer surface of the insert section 150 and the inner circumferential surface of the outer wall 145 of the coolant flow cavity 140.

Figure 10:
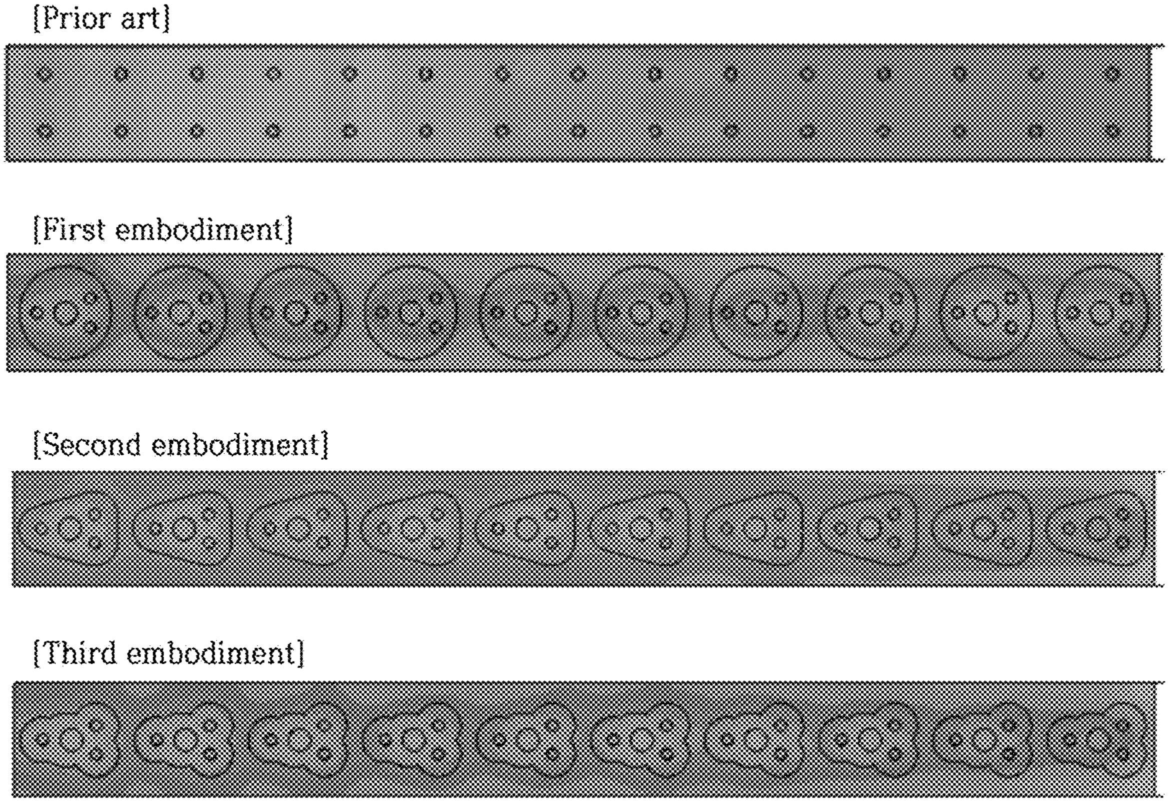
FIG. 10 shows photographs comparing the cooling effects of cooling structures between the conventional technology and the proposed technology.

FIG. 10 shows photographs comparing the cooling of cooling structures between the conventional technology and the proposed technology.

In the conventional technology, there is an impinging air-jet cooling flow path structure in which only a plurality of cooling holes are formed in the air-jetting plate and no cooling structure such as a cooling fin is formed.

In the first embodiment, the support part of the cooling structure is formed in the form of a circular disk.

In the second embodiment, the support part of the cooling structure is formed in the form of a disk with the vertices of an isosceles triangle rounded to enclose the impinging air-jet holes.

In the third embodiment, the support part of the cooling structure is formed in the form of a disk whose outline is a connection of arcs surrounding the impinging air-jet hole and the cooling fin.

In the conventional technology, it could be seen that the temperature difference between the upstream and downstream sides in the impinging air-jet cooling flow path is very large. This may mean that the cooling efficiency is degraded due to a significant amount of cross-flow of the impinging cooling air.

On the other hand, in the cooling structure according to the embodiments of the present disclosure, it could be seen that the cross-flow of the impinging cooling air was reduced by approximately 40% or more over the conventional technology, and the overall cooling efficiency was improved by approximately 30% or more over the conventional technology.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure.

The invention claimed is:

1. An airfoil of a turbine blade or a turbine vane, the airfoil comprising:

a coolant flow cavity formed in an interior of the airfoil;

an insert section inserted into the coolant flow cavity and having a plurality of cooling holes; and a cooling structure arranged between an outer surface of the insert section and an inner surface of the coolant flow cavity, the cooling structure comprising:

a support part disposed in close contact with the outer surface of the insert section and having a plurality of impinging air-jet holes in fluid communication with the plurality of cooling holes; and a cooling fin connected between a distal side of the support part relative to a center of the airfoil and the inner surface of the coolant flow cavity, wherein the plurality of impinging air-jet holes comprise a first air-jet hole disposed upstream of the cooling fin, and a pair of second air-jet holes disposed downstream of the cooling fin.

2. The airfoil according to claim 1, wherein the support part is formed as a circular disk with a predetermined thickness.

3. The airfoil according to claim 2, wherein, assuming that a diameter of each of the plurality of impinging air-jet holes is d, a longitudinal length of the cooling fin is formed to be 2 to 4 times d, and a thickness of the support part is formed to be 2 to 4 times d.

4. The airfoil according to claim 1, wherein the support part is formed as a triangular disk of a predetermined thickness having rounded vertices.

5. The airfoil according to claim 4, wherein the plurality of impinging air-jet holes comprise a first air-jet hole disposed upstream of the cooling fin, and a pair of second air-jet holes disposed downstream of the cooling fin.

6. The airfoil according to claim 4, wherein, assuming that a diameter of each of the plurality of impinging air-jet holes is d, a longitudinal length of the cooling fin is formed to be 2 to 4 times d, and a thickness of the support part is formed to be 2 to 4 times d.

7. The airfoil according to claim 1, wherein the support part is formed as a triangular disk with rounded corners and two convex sides, having a predetermined thickness, with each of the rounded corners located around each of the plurality of impinging air-jet holes and each of the two convex sides positioned between a pair of the rounded corners.

8. The airfoil according to claim 7, wherein the plurality of impinging air-jet holes comprise a first air-jet hole disposed upstream of the cooling fin, and a pair of second air-jet holes disposed downstream of the cooling fin.

9. The airfoil according to claim 7, wherein, assuming that a diameter of each of the plurality of impinging air-jet holes is d, a longitudinal length of the cooling fin is formed to be 2 to 4 times d, and a thickness of the support part is formed to be 2 to 4 times d.

10. A gas turbine comprising:

a compressor configured to compress incoming air;

a combustor configured to mix the compressed air with fuel and combust an air-fuel mixture; and a turbine having turbine blades and turbine vanes installed in a turbine housing so that the turbine blades are rotated by combustion gases discharged from the combustor, wherein an airfoil of each of the turbine blades or the turbine vanes comprises:

a coolant flow cavity formed in an interior of the airfoil;

an insert section inserted into the coolant flow cavity and having a plurality of cooling holes; and a cooling structure arranged between an outer surface of the insert section and an inner surface of the coolant flow cavity, the cooling structure comprising:

a support part disposed in close contact with the outer surface of the insert section and having a plurality of impinging air-jet holes in fluid communication with the plurality of cooling holes; and a cooling fin connected between a distal side of the support part relative to a center of the airfoil and the inner surface of the coolant flow cavity, wherein the plurality of impinging air-jet holes comprise a first air-jet hole disposed upstream of the cooling fin, and a pair of second air-jet holes disposed downstream of the cooling fin.

11. The gas turbine according to claim 10, wherein the support part is formed as a circular disk of a predetermined thickness.

12. The gas turbine according to claim 11, wherein, assuming that a diameter of each of the plurality of impinging air-jet holes is d, a longitudinal length of the cooling fin is formed to be 2 to 4 times d, and a thickness t of the support part may be formed to be 2 to 4 times d.

13. The gas turbine according to claim 10, wherein the support part is formed as a triangular disk of a predetermined thickness having rounded vertices.

14. The gas turbine according to claim 13, wherein the plurality of impinging air-jet holes comprise a first air-jet hole disposed upstream of the cooling fin, and a pair of second air-jet holes disposed downstream of the cooling fin.

15. The gas turbine according to claim 13, wherein assuming that a diameter of each of the plurality of impinging air-jet holes is d, a longitudinal length of the cooling fin is formed to be 2 to 4 times d, and a thickness t of the support part is formed to be 2 to 4 times d.

16. The gas turbine according to claim 10, wherein the support part is formed as a triangular disk with rounded corners and two convex sides, having a predetermined thickness, with each of the rounded corners located around each of the plurality of impinging air-jet holes and each of the two convex sides positioned between a pair of the rounded corners.

17. The gas turbine according to claim 16, wherein the plurality of impinging air-jet holes comprise a first air-jet hole disposed upstream of the cooling fin, and a pair of second air-jet holes disposed downstream of the cooling fin.

18. The gas turbine according to claim 16, wherein assuming that a diameter of each of the plurality of impinging air-jet holes is d, a longitudinal length of the cooling fin is formed to be 2 to 4 times d, and a thickness of the support part is formed to be 2 to 4 times d.

* * * * *